United States Patent
Zhang et al.

(10) Patent No.: US 11,807,576 B2
(45) Date of Patent: Nov. 7, 2023

(54) NON-ALKALI ALUMINUM SILICATE GLASS, PREPARATION METHOD THEREFOR AND APPLICATION THEREOF

(71) Applicants: TUNGHSU TECHNOLOGY GROUP CO., LTD., Beijing (CN); TUNGHSU GROUP CO., LTD., Hebei (CN)

(72) Inventors: Guangtao Zhang, Hebei (CN); Junfeng Wang, Hebei (CN); Gang Li, Hebei (CN); Wenmei Han, Hebei (CN); Zhiyong Li, Hebei (CN); Dongcheng Yan, Hebei (CN); Lihong Wang, Hebei (CN)

(73) Assignees: TUNGHSU TECHNOLOGY GROUP CO., LTD., Beijing (CN); TUNGHSU GROUP CO., LTD., Hebei (CN)

( * ) Notice: Subject to any disclaimer, the term of this patent is extended or adjusted under 35 U.S.C. 154(b) by 306 days.

(21) Appl. No.: 17/285,993

(22) PCT Filed: Oct. 16, 2019

(86) PCT No.: PCT/CN2019/111444
§ 371 (c)(1),
(2) Date: May 18, 2021

(87) PCT Pub. No.: WO2020/078376
PCT Pub. Date: Apr. 23, 2020

(65) Prior Publication Data
US 2021/0380471 A1 Dec. 9, 2021

(30) Foreign Application Priority Data

Oct. 16, 2018 (CN) .......................... 201811204465.3

(51) Int. Cl.
*C03C 3/087* (2006.01)
*C03C 3/118* (2006.01)

(52) U.S. Cl.
CPC .................................... *C03C 3/118* (2013.01)

(58) Field of Classification Search
CPC ................................ C03C 3/087; C03C 3/095
See application file for complete search history.

(56) References Cited

U.S. PATENT DOCUMENTS

| 8,187,715 B2 * | 5/2012 | Danielson | C03C 3/095 428/432 |
| 2009/0286091 A1 * | 11/2009 | Danielson | C03C 3/095 501/64 |
| 2013/0296157 A1 * | 11/2013 | Ellison | C03C 3/093 501/59 |
| 2014/0366581 A1 | 12/2014 | Tokunaga | |
| 2016/0168014 A1 | 1/2016 | Bowden | |
| 2016/0168011 A1 | 6/2016 | Ando | |

FOREIGN PATENT DOCUMENTS

| CN | 1559945 A | 8/2004 |
| CN | 102066273 A | 5/2011 |
| CN | 102951840 A | 3/2013 |
| CN | 103910487 A | 7/2014 |
| CN | 104136383 A | 11/2014 |
| CN | 105502929 A | 4/2016 |
| CN | 105601105 A | 5/2016 |
| CN | 105859127 A | 8/2016 |
| CN | 105859129 A | 8/2016 |
| CN | 107129142 A | 9/2017 |
| CN | 108341595 A | 7/2018 |
| CN | 109160727 A | 1/2019 |
| CN | 109231819 A | 1/2019 |
| EP | 0665192 A1 | 1/1995 |
| JP | 2013056817 A | 3/2013 |
| JP | 2016074551 A | 5/2016 |
| JP | 2016113363 A | 6/2016 |
| JP | 2016199467 A | 12/2016 |
| JP | 2017178711 A | 10/2017 |
| JP | 2017182856 A | 10/2017 |
| JP | 2017533171 A | 11/2017 |

(Continued)

OTHER PUBLICATIONS

Notice of Reasons for Refusal for Patent Appl. No. JP2021-521018 dated Oct. 14, 2022 4 pages.
Search Report by Registered Search Organization for Patent Appl. No. JP2021-521018 dated Jun. 30, 2022, 23 pages.
International Search Report and Written Opinion for PCT Appl. No. PCT/CN2019/111445, dated Jan. 6, 2020, 8 Pages.
International Search Report and Written Opinion for PCT Appl. No. PCT/CN2019/111444, dated Jan. 3, 2020, 9 Pages.
Supplementary European Search Report for EP Application No. 19872783, dated Nov. 17, 2021, 4 pages.
Glass Production Process Technology, 1st edition, Dec. 2013, Wang Wei et al, Wuhan University of Technology Press, p. 45.

*Primary Examiner* — Karl E Group
(74) *Attorney, Agent, or Firm* — Maine Cernota & Curran

(57) ABSTRACT

The invention relates to the field of glass manufacturing, and discloses non-alkali aluminum silicate glass and a preparation method as well as application thereof. A glass melt of the non-alkali aluminum silicate glass at 1600° C. has a resistivity of 200 Ω·cm or less; a temperature $T_{35000}$ corresponding to 35000 P viscosity is 1250° C. or more; an annealing point corresponding to 1013 P viscosity is 790° C. or more, based on a total molar weight of the non-alkali aluminum silicate glass, the non-alkali aluminum silicate glass comprises, by oxide, 69-73 mol % of $SiO_2$, 11-15 mol % of $Al_2O_3$, 0-2 mol % of $B_2O_3$, 2-8 mol % of MgO, 2-8 mol % of CaO, 0-3 mol % of SrO, 3-10 mol % of BaO, 0.1-2 mol % of ZnO, 0.02-0.7 mol % of $RE_2O_3$, 0.01-0.5 mol % of $Se_2O_3$ and $R_2O$, less than 0.05 mol %, wherein RE represents rare earth elements, and R represents alkali metals.

19 Claims, No Drawings

(56) References Cited

FOREIGN PATENT DOCUMENTS

| WO | 2012103194 A1 | 8/2012 |
| WO | 2013129368 A1 | 9/2013 |
| WO | 2015033920 A1 | 3/2015 |
| WO | 2016069821 A1 | 5/2016 |

* cited by examiner

NON-ALKALI ALUMINUM SILICATE GLASS, PREPARATION METHOD THEREFOR AND APPLICATION THEREOF

RELATED APPLICATIONS

This application is a national phase application filed under 35 USC § 371 of PCT Application No. PCT/CN2019/111444 with an International filing date of Oct. 16, 2019. Application PCT/CN2019/111444 claims Chinese Application No. 201811204465.3, filed Oct. 16, 2018. Both of these applications are herein incorporated herein by reference in their entirety for all purposes.

FIELD OF THE INVENTION

The present invention relates to the field of glass manufacturing, in particular to non-alkali aluminum silicate glass, a preparation method therefor and an application thereof.

BACKGROUND OF THE INVENTION

As the optoelectronic industry rapidly develops, there is an increasing need for various display devices, e.g., active-matrix liquid crystal display (AMLCD), organic light emitting diode (OLED) and low temperature poly silicon active matrix liquid crystal display (LTPS TFT-LCD), which are all based on a technology of producing thin film transistors (TFTs) with thin-film semiconductor materials. Mainstream silicon-based TFTs can be classified into amorphous silicon (a-Si) TFTs, polycrystalline silicon (p-Si) TFTs and single crystal silicon (SCS) TFTs, among which a-Si TFTs are a technology applied by current mainstream TFT-LCDs. As for the a-Si TFT technology, the treatment temperature in a production process can be in the range of 300-450° C. LTPS polycrystalline silicon (p-Si) TFTs need to be treated a plurality of times at a relatively high temperature in a manufacturing process, substrates should be free from deformation during the plurality of times of high-temperature treatment, and consequently, higher requirements on performance of substrate glass are made, preferably a strain point is higher than 650° C., more preferably the strain point is higher than 670° C., 700° C. and 720° C., so the substrates may suffer thermal shrinkage as little as possible in a panel manufacturing process. Concurrently, a coefficient of expansion of the glass substrates needs to be similar to that of silicon in order to reduce strain and damage as much as possible, accordingly a preferred coefficient of linear thermal expansion of the substrate glass is in the range of 28-41×10−7/° C. To facilitate production, glass for display substrates should have a relatively low melting temperature, high-temperature surface tension, high-temperature volume resistivity and liquidus temperature.

As for glass substrates for panel display, sputtering, chemical vapor deposition (CVD) and other technologies need to be adopted to form transparent conductive films, insulating films, semiconductor (p-Si, a-Si, etc.) films and metal films on surfaces of underlying substrate glass, and a photo-etching technology is then adopted to form various circuits and patterns. If glass contains alkali metal oxides (Na$_2$O, K$_2$O, Li$_2$O), alkali metal ions may spread into deposited semiconductor materials in a heat treatment process to damage properties of semiconductor films, accordingly the glass should be free from alkali metal oxides, preferably the glass is alkaline earth aluminum silicate glass that contains main components, e.g., SiO$_2$, Al$_2$O$_3$, B$_2$O$_3$ and alkaline earth metal oxides RO (RO=Mg, Ca, Sr, BaO).

The increase of the content of glass forming components and the decrease of the content of a modifier may cause the rise of the annealing point and the strain point of most silicate glass, which may, concurrently, cause difficulty in high-temperature melting and clarifying, cause severe erosion to refractory materials and increase energy consumption and production cost. Therefore, by component improvements, low-temperature viscosity is increased, at the same time, high-temperature viscosity is kept free from sharp increase, and even drop becomes the optimal breakthrough to improve thermal stability.

Non-alkali glass for display generally needs to be heated to 1600° C. or above during melting due to high viscosity. A common flame melting technology has deficiency in the control over quality and process of non-alkali glass, and a boosting electric melting or all-electric melting technology must be adopted to efficiently melt glass efficiently. The non-alkali glass for display is an electrical insulator at room temperature and has resistivity of 1019-1022 Ω·cm. When the non-alkali glass for display is heated, its conductivity is remarkably enhanced when temperature rises. However, compared to high-alkali metal silicate glass with resistivity typically less than 10 Ω·cm in a molten state, the non-alkali glass for display still has relatively high resistivity, which is not conductive to the improvement of thermal efficiency. An electric boosting or all-electric melting technology converts electric energy into heat energy by using conductive heating features of molten glass at high temperature, then glass generates heat from the inside to raise internal temperature and reduce temperature difference between an upper layer and a lower layer, thereby realizing a better clarifying effect and generating heat much more than that absorbed through flame radiation heating, and consequently, energy is saved, a melting rate of glass is greatly improved, and quality of molten glass is improved. The key to affect the Joule heat effect of glass is resistivity of non-alkali molten glass at high temperature. If high-temperature resistivity is too low, the Joule heat effect may be weakened, and generated heat cannot meet the melting requirement, but to deteriorate high-temperature viscosity; and if high-temperature resistivity is too high, conductivity of molten glass may be affected, and then current in ohmic heating flows to refractory materials to cause high-temperature erosion to the refractory materials. Therefore, the purposes of increasing melting efficiency and improving quality of molten glass can be realized only when resistivity of molten glass at high temperature is controlled within a reasonable range.

During processing of glass substrates, a glass substrate is horizontally positioned and, under the action of self-weight, glass droops to a certain degree, the drooping degree is in direct proportion to a density of glass and in inverse proportion to an elasticity modulus of glass. Because large and thinned substrates need to be manufactured, it should be brought into attention that glass plates droop during manufacturing. Therefore, composition needs to be designed, so the glass substrate may have a density as low as possible and an elasticity modulus as high as possible.

In some flat panel display manufacturing processes, ultraviolet rays need to be used as energy to separate display units from substrate glass in contact with the display units. In order to reduce the cost for separation and increase the success rate, the glass substrate needs to have a relatively high and stable penetration rate in ultraviolet region, for example, for a glass substrate with a thickness of 0.5 mm, it is required that the penetration rate is higher than 60% at the wavelength of 308 nm, and the range of penetration rates of different glass substrates in the same batch is within 1%.

Nevertheless, due to inevitable factors, components, e.g., $SO_3$ and $Fe_3O_4$, which have strong absorbability in ultraviolet region may be introduced more or less in the manufacturing process of the glass substrates, and thus contents of impurity components in raw materials corresponding to the components need to be strictly controlled in the manufacturing process of the glass substrates. However, raw materials with too low contents of impurities mean rise of manufacturing cost, which leads to slightly high cost of overall industry chain as a result of a domino effect. Accordingly, on the premise that contents of impurities (e.g., iron oxide) are controlled to a not too low level in a certain way in glass manufacturing, glass with high ultraviolet transmittance is manufactured, which may facilitate the control over the cost of overall industry chain and conform to industry concept of green manufacturing.

SUMMARY OF THE INVENTION

An objective of the present invention is to provide non-alkali aluminum silicate glass, a preparation method therefor and an application thereof in order to overcome the defects that existing aluminum silicate glass has no ideal glass homogenizing effect on display substrates and is relatively low in penetration rate at the wavelength of 308 nm. The non-alkali aluminum silicate glass has a relatively low density and a relatively high elasticity modulus, good thermal stability and a relatively low thermal shrinkage rate and also has a high penetration rate at the wavelength of 308 nm and/or 550 nm.

In order to realize the objective, in a first aspect, the present invention provides non-alkali aluminum silicate glass, wherein a glass melt of the non-alkali aluminum silicate glass at 1600° C. has a resistivity of 200 Ω·cm or less;

a temperature $T_{35000}$ corresponding to 35000 P viscosity is 1250° C. or more;

an annealing point corresponding to 1013 P viscosity is 790° C. or more.

Preferably, the glass melt of the non-alkali aluminum silicate glass at 1600° C. has a viscosity of 350-550 P.

Preferably, the content of sulfur element, represented in the form of elemental sulfur S, in the non-alkali aluminum silicate glass is 50 ppm or less.

Preferably, the content of hydroxyl group in the non-alkali aluminum silicate glass is 0.3/mm or less.

Preferably, based on a total molar weight of the non-alkali aluminum silicate glass, the non-alkali aluminum silicate glass comprises, by oxide, 69-73 mol % of $SiO_2$, 11-15 mol % of $Al_2O_3$, 0-2 mol % of $B_2O_3$, 2-8 mol % of MgO, 2-8 mol % of CaO, 0-3 mol % of SrO, 3-10 mol % of BaO, 0.1-2 mol % of ZnO, 0.02-0.7 mol % of $RE_2O_3$, 0.01-0.5 mol % of $Se_2O_3$ and $R_2O$ less than 0.05 mol %, wherein RE represents rare earth elements, and R represents alkali metals.

Preferably, based on the total molar weight of the non-alkali aluminum silicate glass, the non-alkali aluminum silicate glass comprises, by oxide, 70-72 mol % of $SiO_2$, 12-14 mol % of $Al_2O_3$, 0-1 mol % of $B_2O_3$, 3-5 mol % of MgO, 3-6 mol % of CaO, 0.1-1 mol % of SrO, 4-7 mol % of BaO, 0.3-1.5 mol % of ZnO, 0.1-0.5 mol % of $RE_2O_3$, 0.02-0.3 mol % of $Se_2O_3$ and $R_2O$ less than 0.05 mol %.

Preferably, based on the total molar weight of the non-alkali aluminum silicate glass, represented in the form of $Fe_2O_3$, the non-alkali aluminum silicate glass comprises 0.001-0.01 mol % of $Fe_2O_3$.

Preferably, based on the total molar weight of the non-alkali aluminum silicate glass, represented in the form of elemental F, the non-alkali aluminum silicate glass comprises 0.01-0.8 mol % of F.

Preferably, by molar percentage, $Se_2O_3/Fe_2O_3>10$.

Preferably, by molar percentage, the contents of the components in the non-alkali aluminum silicate glass meet a formula: Z=1.5-4.5, wherein Z is calculated according to the following formula:

$$Z=-10.31+(16.04\times SiO2+6\times Al2O3+3.29\times B_2O_3-5.47\times MgO-5.43\times CaO+3.77\times SrO+26.65\times BaO-7.82\times ZnO),$$

wherein $SiO_2$, $Al_2O_3$, MgO, CaO, SrO, BaO and ZnO represent molar percentages of the components in the non-alkali aluminum silicate glass, respectively.

Preferably, by molar percentage, the contents of the components in the non-alkali aluminum silicate glass meet a formula: G=2.5-6, wherein G is calculated according to the following formula:

$$G=-10.31+(16.04\times SiO_2+6\times Al_2O_3+3.29\times B_2O_3-5.47\times MgO-5.43\times CaO+3.77\times SrO+26.65\times BaO-7.82\times ZnO+214.8\times RE_2O_3+86.3\times Se_2O_3),$$

wherein $SiO_2$, $Al_2O_3$, $B_2O_3$, MgO, CaO, SrO, BaO, ZnO, $RE_2O_3$ and $Se_2O_3$ represent molar percentages of the components in the non-alkali aluminum silicate glass, respectively.

Preferably, by molar percentage, the contents of the components in the non-alkali aluminum silicate glass meet a formula: T=3-6.5, wherein T is calculated according to the following formula:

$$T=-10.31+(16.04\times SiO_2+6\times Al_2O_3+3.29\times B_2O_3-5.47\times MgO-5.43\times CaO+3.77\times SrO+26.65\times BaO-7.82\times ZnO+214.8\times RE_2O_3+86.3\times Se_2O_3+162.5\times F),$$

wherein $SiO_2$, $Al_2O_3$, $B_2O_3$, MgO, CaO, SrO, BaO, ZnO, $RE_2O_3$, $Se_2O_3$ and F represent molar percentages of the components in the non-alkali aluminum silicate glass, respectively.

Preferably, by molar percentage, $(CaO+BaO)/(MgO+CaO+SrO+BaO+ZnO)\geq 0.6$.

Preferably, $(MgO+BaO)/(1-MO)\geq 0.5$, wherein based on the total molar weight of the non-alkali aluminum silicate glass, MO represents the sum of the molar percentages of the components except $SiO_2$, $Al_2O_3$ and $B_2O_3$ in the non-alkali aluminum silicate glass.

Preferably, RE represents yttrium and lanthanide, and R represents Li, Na and K; and RE represents one or more of Y, La, Nd and Lu.

Preferably, a density of the non-alkali aluminum silicate glass is less than 2.7 g/cm3; a coefficient of thermal expansion at 50-350° C. is less than 40×10−7/° C.; a Young's modulus is greater than 80 GPa; a modular ratio is greater than 30 GPa/(g×cm−3).

Preferably, a temperature $T_{200}$ corresponding to 200 P viscosity of the non-alkali aluminum silicate glass is 1730° C. or less; a temperature $T_{35000}$ corresponding to 35000 P viscosity is 1250° C. or more; a liquidus temperature TL is 1260° C. or less; and a difference between the temperature corresponding to 35000 P viscosity and the liquidus temperature TL is 50° C. or more.

Preferably, a transmittance at a wavelength of 308 nm is 73% or more; and a transmittance at a wavelength of 550 nm is 91% or more.

Preferably, a thermal shrinkage rate under the condition of 600° C./20 min is less than 15 ppm.

In a second aspect, the present invention provides a preparation method of non-alkali aluminum silicate glass. The method comprises: sequentially performing melting treatment, forming treatment, annealing treatment and machining treatment on the non-alkali aluminum silicate glass of the present invention.

In a third aspect, the present invention provides application of the non-alkali aluminum silicate glass of the present invention in preparation of display devices and/or solar cells.

The non-alkali aluminum silicate glass of the present invention has a relatively low density and a relatively high elasticity modulus, good thermal stability and a relatively low thermal shrinkage rate and also has the advantage of high penetration rate at the wavelength of 308 nm and/or 550 nm, etc. The non-alkali aluminum silicate glass can be applied to the preparation of display devices and/or solar cells, preferably suitable for the application fields of preparation of glass substrate materials and/or glass film materials for screen surface protection of flat panel display products, glass substrate materials and/or glass materials for surface packaging and/or glass film materials for screen surface protection of flexible display products, glass substrate materials of flexible solar cells, safety glass, bulletproof glass, intelligent automobile glass, intelligent traffic display screens, intelligent shop windows, intelligent cards and tickets and glass materials for other needs with high thermal stability, high ultraviolet transmittance and high mechanical stability.

DETAILED DESCRIPTION

The specific embodiments of the present invention are described in detail below. It should be understood that the specific embodiments as described herein are only used for illustrating and interpreting the present invention, but not to limit the present invention.

In a first aspect, the present invention provides non-alkali aluminum silicate glass, wherein a glass melt of the non-alkali aluminum silicate glass at 1600° C. has a resistivity of 200 Ω·cm or less;

a temperature $T_{35000}$ corresponding to 35000 P viscosity is 1250° C. or more; and an annealing point corresponding to 1013 P viscosity is 790° C. or more.

In a preferred embodiment of the present invention, the glass melt of the non-alkali aluminum silicate glass at 1600° C. has a viscosity in a range of 350-550 P; the content of sulfur element, represented in the form of elemental sulfur S, in the non-alkali aluminum silicate glass is 50 ppm or less; and the content of hydroxyl group in the non-alkali aluminum silicate glass is 0.3/mm or less.

Based on a total molar weight of the non-alkali aluminum silicate glass, the non-alkali aluminum silicate glass comprises, by oxide, 70-72 mol % of $SiO_2$, 12-14 mol % of $Al_2O_3$, 0-1 mol % of $B_2O_3$, 3-5 mol % of MgO, 3-6 mol % of CaO, 0.1-1 mol % of SrO, 4-7 mol % of BaO, 0.3-1.5 mol % of ZnO, 0.1-0.5 mol % of $RE_2O_3$, 0.02-0.3 mol % of $Se_2O_3$ and $R_2O$ less than 0.05 mol %.

In the non-alkali aluminum silicate glass of the present invention, $SiO_2$ is a glass forming component. Too low content of $SiO_2$ may not contribute to enhancing thermal stability, but may cause a too high coefficient of expansion, as a result, glass is prone to devitrification. If the content of $SiO_2$ is increased, glass may have a light weight, lower coefficient of thermal expansion, higher strain point and higher chemical resistance, but high-temperature viscosity is increased, and consequently, melting is not easy, and ordinary kilns may hardly meet the melting requirement. Therefore, according to overall consideration, based on the total molar weight of the non-alkali aluminum silicate glass, the content of $SiO_2$ may be, by oxide, 69-73 mol %, preferably 70-72 mol %, and specifically the content of $SiO_2$ may be, e.g., 69 mol %, 69.2 mol %, 69.56 mol %, 69.95 mol %, 70.2 mol %, 70.4 mol %, 70.6 mol %, 70.7 mol %, 70.9 mol %, 71.1 mol %, 71.4 mol %, 71.6 mol %, 71.9 mol %, 72 mol %, 72.4 mol %, 72.97 mol %, 73 mol % and any numerical value in a range defined by any two of these numerical values.

In the non-alkali aluminum silicate glass of the present invention, $Al_2O_3$ is used to improve the strength of a glass structure. When the content of $Al_2O_3$ is less than 11 mol %, the glass is prone to devitrification and is also prone to erosion by external water and chemical reagents. The high content of $Al_2O_3$ contributes to improving strain point and bending strength of glass. Nevertheless, if the content of $Al_2O_3$ is too high, the glass is prone to crystallization. Therefore, according to overall consideration, based on the total molar weight of the non-alkali aluminum silicate glass, the content of $Al_2O_3$ may be, by oxide, 11-15 mol %, preferably 12-14 mol %, and specifically the content of Al2O3 may be, e.g., 11 mol %, 11.1 mol %, 11.3 mol %, 11.4 mol %, 11.6 mol %, 11.95 mol %, 12 mol %, 12.4 mol %, 12.6 mol %, 12.7 mol %, 12.8 mol %, 12.9 mol %, 13 mol %, 13.3 mol %, 13.4 mol %, 13.5 mol %, 13.6 mol %, 13.7 mol %, 13.8 mol %, 13.9 mol %, 14 mol %, 14.4 mol %, 14.5 mol %, 14.69 mol %, 14.9 mol %, 15 mol % and any numerical value in a range defined by any two of these numerical values.

In the non-alkali aluminum silicate glass of the present invention, $B_2O_3$ is a quite good flux for independently producing glass and can hardly form $[BO_4]$ under a high-temperature melting condition, so high-temperature viscosity can be reduced. At low temperature, B has a tendency of capturing free oxygens to form $[BO_4]$, thereby tightening the structure, improving low-temperature viscosity of glass, and preventing crystallization. Nevertheless, too much $B_2O_3$ may greatly lower a strain point of glass. Therefore, according to overall consideration, based on the total molar weight of the non-alkali aluminum silicate glass, the content of $B_2O_3$ may be, by oxide, 0-2 mol %, preferably 0-1 mol %, and more preferably 0, and specifically the content of $B_2O_3$ may be, e.g., 0, 0.1 mol %, 0.11 mol %, 0.3 mol %, 0.42 mol %, 0.46 mol %, 0.47 mol %, 0.7 mol %, 1 mol %, 1.31 mol %, 1.4 mol %, 1.6 mol %, 1.9 mol %, 2 mol % and any numerical value in a range defined by any two of these numerical values.

In the non-alkali aluminum silicate glass of the present invention, MgO has the advantages of greatly increasing Young's modulus and modular ratio of glass, reducing high-temperature viscosity and making glass easy to melt. When the content of alkaline earth metals in glass is relatively low, an out-of-network ion Mg₂+ with relatively high electric field intensity is introduced, thereby easily realizing a local accumulation effect in the structure and enlarging a short-range order range. In this case, more intermediate oxide $Al_2O_3$ is introduced. Polyhedrons, existing in the form of $[AlO_4]$, carry negative charges and attract part of out-of-network cations, thereby lowering the accumulation degree and crystallization capacity of glass. When the content of alkali earth metals is relatively high and network breakage is relatively severe, MgO may be introduced to reconnect broken silicon-oxygen tetrahedrons so as to lower the crystallization capacity of glass. Accordingly, it should be paid attention to a coordination ratio of MgO to other components when MgO is added. Compared to other alkaline earth metal oxides, MgO may bring a relatively low coefficient of expansion and density, and relatively high chemical resistance, strain point and elasticity modulus. If the content of MgO is greater than 8 mol %, chemical resistance of glass may be lowered, and concurrently glass is prone to devitrification. Therefore, according to overall consideration, based on the total molar weight of the non-alkali aluminum silicate glass, the content of MgO may be, by oxide, 2-8 mol %, preferably 3-5 mol %, and specifically the content of MgO may be, e.g., 2 mol %, 2.2 mol %, 2.8 mol %, 3 mol %, 3.2 mol %, 3.3 mol %, 3.6 mol %, 3.9 mol %, 4.2 mol %, 4.4 mol %, 4.6 mol %, 4.7 mol %, 4.9 mol %, 4.96 mol %, 5 mol %, 5.5 mol %, 6.4 mol %, 7 mol %, 7.4 mol %, 7.95 mol %, 8 mol % and any numerical value in a range defined by any two of these numerical values.

In the non-alkali aluminum silicate glass of the present invention, CaO is used to promote melting of glass and adjust formability of glass. If the content of CaO is less than 2 mol %, the viscosity of glass may not be lowered easily, if the content is too high, glass is otherwise prone to crystallization, accordingly, the coefficient of thermal expansion may greatly increase and brittleness may increase, and thus subsequent process is not facilitated. Therefore, according to overall consideration, based on the total molar weight of the non-alkali aluminum silicate glass, the content of CaO may be, by oxide, 2-8 mol %, preferably 3-6 mol %, and specifically the content of CaO may be, e.g., 2 mol %, 2.1 mol %, 2.4 mol %, 2.5 mol %, 2.9 mol %, 3 mol %, 3.4 mol %, 3.7 mol %, 4.1 mol %, 4.3 mol %, 4.5 mol %, 4.6 mol %, 5.1 mol %, 5.4 mol %, 5.7 mol %, 5.9 mol %, 5.95 mol %, 6 mol %, 6.6 mol %, 7 mol %, 7.4 mol %, 8 mol % and any numerical value in a range defined by any two of these numerical values.

In the non-alkali aluminum silicate glass of the present invention, SrO serves as a flux and a component for preventing glass from crystallization. A too high content of SrO may cause a too high density of glass and the decrease of a specific modulus of a product. $Sr_2+$, as a divalent metal ion with a relatively large radius, has a relatively high coordination number and always fills gaps of a tetrahedron network framework in non-alkali glass. Although $Sr_2+$ has the advantages of improving chemical stability and mechanical stability, a too high content of $Sr_2+$ may cause the increase of density and occurrence rates of cracks, devitrification and phase splitting. Therefore, according to overall consideration, based on the total molar weight of the non-alkali aluminum silicate glass, the content of SrO may be, by oxide, 0-3 mol %, preferably 0.1-1 mol %, and specifically the content of SrO may be, e.g., 0, 0.1 mol %, 0.2 mol %, 0.3 mol %, 0.4 mol %, 0.5 mol %, 0.76 mol %, 0.8 mol %, 1 mol %, 1.4 mol %, 1.5 mol %, 1.7 mol %, 2 mol %, 2.2 mol %, 2.6 mol %, 3 mol % and any numerical value in a range defined by any two of these numerical values.

In the non-alkali aluminum silicate glass of the present invention, BaO serves as a flux and a component for preventing glass from crystallization. A too high content of BaO may cause the increase of high-temperature volume resistivity of glass, a too high density and the decrease of a specific modulus of a product. Although MgO, CaO, SrO and BaO are all alkaline earth metal oxides, it is found through experiments that different oxide may have quite different influences on glass forming stability, and a proper increase of the content of BaO and a control over a reasonable proportion range contribute to improving forming stability, improving crystallization resistance (glass forming stability) and optimizing overall performance. Therefore, according to overall consideration, based on the total molar weight of the non-alkali aluminum silicate glass, the content of BaO may be, by oxide, 3-10 mol %, preferably 4-7 mol %, and specifically the content of BaO may be, e.g., 3 mol %, 3.2 mol %, 3.95 mol %, 4.1 mol %, 4.67 mol %, 4.8 mol %, 4.84 mol %, 4.9 mol %, 5.1 mol %, 5.9 mol %, 6.7 mol %, 6.95 mol %, 7 mol %, 7.9 mol %, 10 mol % and any numerical value in a range defined by any two of these numerical values.

In the non-alkali aluminum silicate glass of the present invention, divalent metal oxides can be, according to positions in the periodic table of elements and different influences on properties, classified into two types: alkaline earth metal oxides located in the main group of the periodic table of elements, whose ions $R_2+$ having 8 outer electrons; metal oxides (e.g., ZnO and CdO) located in the subgroup of the periodic table of elements, whose ions $R_2+$ having 18 outer electrons, and these two types of metal oxides have different structural states in glass and different influences on properties of glass. ZnO may reduce high-temperature viscosity (e.g., viscosity at 1500° C.) of glass and contribute to eliminating bubbles. Meanwhile, ZnO has, below a softening point, the effects of improving strength and hardness, increasing chemical resistance of glass, and reducing a coefficient of thermal expansion of glass. In a non-alkali glass or low-alkali glass system, the addition of a proper amount of ZnO contributes to inhibiting crystallization and may lower a crystallization temperature. Theoretically, after being introduced into non-alkali glass or low-alkali glass as an network modifier, ZnO generally exists at high temperature in the form of $[ZnO_4]$, which makes a glass structure looser than $[ZnO6]$. Compared to glass comprising no ZnO at the same high temperature, the glass comprising ZnO has lower viscosity, atoms move faster and cannot form crystal nucleuses, crystal nucleuses cannot be formed until temperature is further lowered, and accordingly, an upper limit temperature of crystallization of glass is lowered. A too high content of ZnO may greatly lower a strain point of glass. Therefore, according to overall consideration, based on the total molar weight of the non-alkali aluminum silicate glass, the content of ZnO may be, by oxide, 0.1-2 mol %, preferably 0.3-1.5 mol %, and specifically the content of ZnO may be, e.g., 0.1 mol %, 0.13 mol %, 0.2 mol %, 0.25 mol %, 0.3 mol %, 0.37 mol %, 0.4 mol %, 0.43 mol %, 0.44 mol %, 0.45 mol %, 0.5 mol %, 0.65 mol %, 0.8 mol %, 0.9 mol %, 1 mol %, 1.2 mol %, 1.27 mol %, 1.43 mol %, 1.48 mol %, 1.5 mol %, 2 mol % and any numerical value in a range defined by any two of these numerical values.

In the non-alkali aluminum silicate glass of the present invention, rare earth oxide, $RE_2O_3$, has a unique capacity of improving certain performance of glass, e.g., the addition of the rare earth oxide contributes to the sharp increase of bending strength, elasticity modulus, strain point and other performance of glass, promotes the decrease of brittleness of glass and the sharp increase of fracture toughness, and may reduce the high-temperature viscosity and high-temperature volume resistivity of glass, thereby bringing great convenience to large industrial manufacturing of glass, particularly melting of glass by electric melting and/or electric boosting. After alkaline-earth metals, ZnO and other network modifiers are introduced into the composition of glass, surplus oxygen atoms enable oxo-bridged oxygen bonds in a glass structure to crack to generate non-bridging oxygens, and thus the bending strength of glass is substantially reduced due to the presence of the non-bridging oxygens. The addition of $RE_2O_3$ promotes the change of an internal structure of glass and generates a chemical bond Si—O—RE to reconnect isolated island network units in glass, thereby improving the network structure of glass, substantially improving the bending strength, elasticity modulus, strain point and chemical stability of glass and reducing high-temperature volume resistivity and other performance. Nevertheless, when $RE_2O_3$ is further increased, due to the decrease of the number of adjustable non-bridging oxygens, the surplus $RE_2O_3$ has little influence on the aforesaid performance of glass. Therefore, according to overall consideration of absorption spectrum and other properties, based on the total molar weight of the non-alkali aluminum silicate glass, the content of $RE_2O_3$ may be, by oxide, 0.02-0.7 mol %, preferably 0.1-0.5 mol %, and RE represents yttrium and lanthanide. Preferably, RE represents one or more of Y, La, Nd and Lu. In a specific embodiment of the present invention, RE represents Y or Lu, RE represents combinations of various elements, e.g., combinations of La and Nd; Y and La; Y and Nd; La, Nd and Lu, and specifically, the content of $RE_2O_3$ may be, e.g., 0.02 mol %, 0.1 mol %, 0.2 mol %, 0.23 mol %, 0.26 mol %, 0.28 mol %, 0.35 mol %, 0.36 mol %, 0.37 mol %, 0.4 mol %, 0.41 mol %, 0.43 mol %, 0.45 mol %, 0.48 mol %, 0.5 mol %, 0.7 mol % and any numerical value in a range defined by any two of these numerical values.

In the non-alkali aluminum silicate glass of the present invention, $Se_2O_3$ serves as a flux and a component for preventing glass from crystallization. For glass comprising iron oxide (especially iron oxide at low valence), selenium oxide may reduce absorbability of glass at the wavelength of 308 nm in an ultraviolet spectral region and increase transmittance of glass at the wavelength of 308 nm. If the content is too high, a transmittance of glass at the wavelength of 380-780 nm may decrease. Therefore, according to overall consideration, based on the total molar weight of the non-alkali aluminum silicate glass, the content of $Se_2O_3$ may be, 0.01-0.5 mol %, preferably 0.02-0.3 mol %, and specifically the content of $Se_2O_3$ may be, e.g., 0.01 mol %, 0.02 mol %, 0.03 mol %, 0.1 mol %, 0.14 mol %, 0.19 mol %, 0.21 mol %, 0.25 mol %, 0.27 mol %, 0.29 mol %, 0.3 mol %, 0.35 mol %, 0.39 mol %, 0.4 mol %, 0.43 mol %, 0.44 mol %, 0.45 mol %, 0.5 mol % and any numerical value in a range defined by any two of these numerical values.

In the non-alkali aluminum silicate glass of the present invention, a small amount of iron oxide is inevitably introduced by intrinsic impurities of raw materials, contact in a production process or other ways, which may decrease the transmittance of glass in the ultraviolet spectral region (e.g., at the wavelength of 308 nm) and have adverse effects on a laser lift-off (LLO) technology in the manufacturing process of flexible OLED panels. Accordingly, if less iron oxide in various raw materials is introduced, ultraviolet transmittance may be improved, but when the amount of introduction is reduced too much, cost of raw materials may be sharply increased. A certain amount of fluoride (e.g., calcium fluoride) can effectively reduce viscosity, high-temperature surface tension and high-temperature volume resistivity of glass after being introduced in the glass manufacturing process as a high-temperature flux, and also has a certain clarifying effect in combination with sulfate. On the other hand, fluorine may improve transmittance of glass at the wavelength of 308 nm and transmittance of iron-containing glass at the wavelength of 308 nm in the ultraviolet spectral region without reducing the content of iron oxide on purpose after being added, but if the content is too high, glass is prone to phase splitting or separation, leading to opacification or crystallization. Therefore, according to overall consideration, based on the total molar weight of the non-alkali aluminum silicate glass, represented in the form of $Fe_2O_3$, the content of $Fe_2O_3$ may be, 0.001-0.01 mol %, preferably 0.002-0.008 mol %, and specifically the content may be, e.g., 0.001 mol %, 0.002 mol %, 0.003 mol %, 0.004 mol %, 0.005 mol %, 0.006 mol %, 0.007 mol %, 0.008 mol %, 0.009 mol %, 0.01 mol % and any numerical value in a range defined by any two of these numerical values. Based on the total molar weight of the non-alkali aluminum silicate glass, represented in the form of elemental F, the content of F is 0.01-0.8 mol %, and preferably 0.2-0.6 mol %. Specifically, the content of F may be, e.g., 0.01 mol %, 0.02 mol %, 0.1 mol %, 0.2 mol %, 0.22 mol %, 0.25 mol %, 0.31 mol %, 0.34 mol %, 0.4 mol %, 0.42 mol %, 0.51 mol %, 0.52 mol %, 0.55 mol %, 0.6 mol %, 0.8 mol % and any numerical value in a range defined by any two of these numerical values. Further preferably, according to overall consideration of transmittance, by molar percentage, $Se_2O_3/Fe_2O_3>10$, preferably $Se_2O_3/Fe_2O_3>20$.

In the non-alkali aluminum silicate glass of the present invention, a small amount of alkali metal oxide may be inevitably introduced by intrinsic impurities of raw materials or other ways, which may have adverse effects on the manufacturing process of high-temperature panels, and therefore the content of alkali needs to be strictly controlled. Based on the total molar weight of the non-alkali aluminum silicate glass, the content of alkali metal oxide $R_2O$ is, by oxide, less than 0.05 mol %, wherein $R_2O$ represents the sum of contents of $Li_2O$, $Na_2O$ and $K_2O$.

Preferably, by molar percentage, contents of the components in the non-alkali aluminum silicate glass meet a formula: $Z=1.5-4.5$, preferably $Z=2.5-3.5$, wherein Z is calculated according to the following formula:

$$Z=-10.31+(16.04 \times SiO_2+6 \times Al_2O_3+3.29 \times B_2O_3-5.47 \times MgO-5.43 \times CaO+3.77 \times SrO+26.65 \times BaO-7.82 \times ZnO),$$

wherein $SiO_2$, $Al_2O_3$, MgO, CaO, SrO, BaO and ZnO represent molar percentages of the components in the non-alkali aluminum silicate glass, respectively.

Preferably, by molar percentage, contents of the components in the non-alkali aluminum silicate glass meet a formula: $G=2.5-6$, preferably $G=3-4$, wherein G is calculated according to the following formula:

$$G=-10.31+(16.04 \times SiO_2+6 \times Al_2O_3+3.29 \times B_2O_3-5.47 \times MgO-5.43 \times CaO+3.77 \times SrO+26.65 \times BaO-7.82 \times ZnO+214.8 \times RE_2O_3+86.3 \times Se_2O_3),$$

wherein $SiO_2$, $Al_2O_3$, $B_2O_3$, MgO, CaO, SrO, BaO, ZnO, $RE_2O_3$ and $Se_2O_3$ represent molar percentages of the components in the non-alkali aluminum silicate glass, respectively.

Preferably, by molar percentage, contents of the components in the non-alkali aluminum silicate glass meet a formula: $T=3-6.5$, preferably $T=4-5$, wherein T is calculated according to the following formula:

$$T=-10.31+(16.04 \times SiO_2+6 \times Al_2O_3+3.29 \times B_2O_3-5.47 \times MgO-5.43 \times CaO+3.77 \times SrO+26.65 \times BaO-7.82 \times ZnO+214.8 \times RE_2O_3+86.3 \times Se_2O_3+162.5 \times F),$$

wherein $SiO_2$, $Al_2O_3$, $B_2O_3$, MgO, CaO, SrO, BaO, ZnO, $RE_2O_3$, $Se_2O_3$ and F represent molar percentages of the components in the non-alkali aluminum silicate glass, respectively.

Preferably, by molar percentage, $$(CaO+BaO)/(MgO+CaO+SrO+BaO+ZnO) \geq 0.6.$$

Preferably, by molar percentage, $(MgO+BaO)/(1-MO) \geq 0.5$, wherein based on the total molar weight of the non-alkali aluminum silicate glass, MO represents the sum of molar percentages of the components except $SiO_2$, $Al_2O_3$ and $B_2O_3$ in the non-alkali aluminum silicate glass.

A glass melt of the non-alkali aluminum silicate glass at 1600° C. of the present invention has a resistivity of 200 Ω·cm or less, preferably in a range of 120-180 Ω·cm.

The glass melt of the non-alkali aluminum silicate glass at 1600° C. of the present invention has the viscosity of 350-550 P.

The non-alkali aluminum silicate glass of the present invention has a temperature $T_{35000}$ corresponding to 35000 P viscosity of 1250° C. or more.

The non-alkali aluminum silicate glass of the present invention has an annealing point corresponding to 1013 P viscosity of 790° C. or more, preferably 800° C. or more.

The non-alkali aluminum silicate glass of the present invention has an annealing point corresponding to 1014.5 P viscosity of 750° C. or more, preferably 760° C. or more.

Preferably, the content of hydroxyl group in the non-alkali aluminum silicate glass of the present invention is 0.3/mm or less.

Preferably, the non-alkali aluminum silicate glass of the present invention has a density less than 2.7 g/cm3, preferably less than 2.65 g/cm3; a coefficient of thermal expansion at 50-350° C. less than 40×10−7/° C., preferably less than 39×10−7/° C.; a Young's modulus greater than 80 GPa, preferably greater than 81 GPa; a modular ratio greater than 30 GPa/(g×cm−3), preferably greater than 31 GPa/(g×cm−3).

The non-alkali aluminum silicate glass of the present invention has a temperature T200 corresponding to 200 P viscosity of 1690° C. or less; a temperature $T_{35000}$ corresponding to 35000 P viscosity 1250° C. or more, preferably 1280° C. or more; a liquidus temperature TL 1260° C. or less, preferably 1180° C. or less; and a difference between the temperature corresponding to 35000 P viscosity and the liquidus temperature TL of 50° C. or more, preferably 100° C. or more.

The non-alkali aluminum silicate glass of the present invention has a transmittance at the wavelength of 308 nm of 73% or more, preferably 74% or more; a transmittance at the wavelength of 550 nm of 91% or more, preferably 92% or more.

The non-alkali aluminum silicate glass of the present invention has a thermal shrinkage rate under the condition of 600° C./20 min of less than 15 ppm, preferably less than 10 ppm.

In the non-alkali aluminum silicate glass of the present invention, the non-alkali aluminum silicate glass further comprises clarifying agent(s), based on the total molar weights of the components, the content of the clarifying agent(s) is 0.5 mol % or less, preferably the chemical clarifying agent(s) is at least one of strontium sulfate, calcium sulfate, strontium nitrate and stannous oxide.

In a second aspect, the present invention provides a preparation method of non-alkali aluminum silicate glass. The method comprises: sequentially performing melting treatment, forming treatment, annealing treatment and machining treatment on the non-alkali aluminum silicate glass of the present invention.

In the method of the present invention, preferably, the method further comprises: adding fluoride to the mixture, wherein based on a total weight of the mixture, an addition amount of the fluoride is 0.02-0.7 wt %, and calcium fluoride is adopted in a specific embodiment of the present invention. Calcium fluoride, as a high-temperature flux, has effects of reducing viscosity, high-temperature surface tension and high-temperature volume resistivity of a glass melt, and also has a certain clarifying effect in combination with sulfate. On the other hand, fluorine may increase a transmittance of iron-containing glass at the wavelength of 308 nm in the ultraviolet spectral region. Nevertheless, if the content of fluoride is too high, glass is prone to phase splitting or separation, leading to opacification or crystallization.

Preferably, the mixture is molten at high temperature by a continuous melting tank furnace; further preferably, the mixture is molten at high temperature by electric heating and/or gas heating; more further preferably, the energy provided by electric heating occupies 60% or more in all energy for melting glass; and electric heating means that a plurality of groups of paired electrodes directly heat the mixture and molten glass to help to complete alkali-silicate reaction, glass forming, clarifying and homogenizing and other processes, wherein the electrodes may be stannic oxide electrodes, molybdenum oxide electrodes and/or platinum electrodes, etc.

In the method of the present invention, preferably, conditions of melting treatment comprise: temperature less than 1700° C., and time longer than 1 h. Specific melting temperature and melting time are well known by those skilled in the art and can be determined by those skilled in the art according to actual conditions, which is not described in detail herein.

In the method of the present invention, preferably, conditions of annealing treatment comprise: temperature greater than 780° C., and time longer than 0.1 h. Specific annealing temperature and annealing time are well known by those skilled in the art and can be determined by those skilled in the art according to actual conditions, which is not described in detail herein.

In the method of the present invention, machining treatment is not specially limited and can be various common machining treatments in the art, e.g., cutting, grinding, polishing, etc., on a product obtained after annealing treatment.

Preferably, the method further comprises: performing secondary melting and thinning treatment on a product obtained after machining treatment.

Preferably, by controlling conditions of the machining treatment or secondary melting and thinning treatment, glass with a thickness less than 0.1 mm is prepared.

In a specific embodiment of the present invention, a certain amount of sulfate may be added to serve as a component for eliminating gaseous inclusions, e.g., calcium sulfate, strontium sulfate and other inorganic sulfates. According to overall consideration of spectrum absorption in the ultraviolet spectral region, in order to realize high transmittance in the ultraviolet spectral region, preferably, the content of residual sulfur element, represented in the form of elemental sulfur S, in glass is 50 ppm or less.

In a third aspect, the present invention provides application of the non-alkali aluminum silicate glass of the present invention in preparation of display devices and/or solar cells.

The non-alkali aluminum silicate glass of the present invention has a relatively low density and a relatively high elasticity modulus, good thermal stability and a relatively low thermal shrinkage rate and also has the advantage of high penetration rate at the wavelength of 308 nm and/or 550 nm. The non-alkali aluminum silicate glass can be applied in preparation of display devices and/or solar cells, preferably suitable for the application fields of preparation of glass substrate materials and/or glass film materials for screen surface protection of flat panel display products, glass substrate materials and/or glass materials for surface packaging and/or glass film materials for screen surface protection of flexible display products, glass substrate materials of flexible solar cells, safety glass, bulletproof glass, intelligent automobile glass, intelligent traffic display screens, intelligent shop windows, intelligent cards and tickets and glass materials for other needs with high thermal stability, high ultraviolet transmittance and high mechanical stability.

EXAMPLES

The present invention is described in detail with reference to examples below. Unless otherwise specified, the materials used in examples below can be purchased. Unless otherwise specified, the methods applied are normal methods in the art.

With reference to ASTM C-693, a density of glass is measured and has a unit of g/cm3.

With reference to ASTM E-228, a coefficient of thermal expansion at 50-350° C. of glass is measured by a horizontal dilatometer and has a unit of 10−7/° C.

With reference to ASTM C-623, a Young's modulus of glass is measured and has a unit of GPa.

With reference to ASTM C-965, a high-temperature viscosity-temperature curve of glass is measured by a rotary high-temperature viscometer, where a viscosity corresponding to 1600° C. temperature is η1600 and has a unit of P, and a temperature corresponding to X P viscosity is TX and has a unit of ° C.

With reference to ASTM C-829, a liquidus temperature TL of glass is measured by a temperature gradient furnace method and has a unit of ° C.

With reference to ASTM C-336, an annealing point Ta and a strain point Tst of glass are measured by an annealing point and strain point tester and have a unit of ° C.

A transmittance of glass is measured by a Shimadzu UV-2600 ultraviolet and visible spectrophotometer, a glass sample is 0.5 mm thick, and the transmittances at the wavelengths of 308 nm and 550 nm are taken respectively and have a unit of %.

Contents of iron (represented in the form of $Fe_2O_3$) and fluorine in glass are tested by a thermoelectric iCAP 6300MFC inductively coupled plasma (ICP) emission spectrometer and has a unit of mol % or ppm.

The content of sulfur, represented in the form of S, in glass is tested by a CS-9900 infrared carbon sulfur analyzer and has a unit of ppm.

With reference to a test method of high-temperature resistivity of a glass melt disclosed in the patent application CN201710796764.X, the resistivity of the glass melt at 1600° C. is measured and has a unit of Ω·cm.

A thermal shrinkage rate after heat treatment is measured by the following heat treatment method (difference calculation method): heating glass (with an initial length measured and marked as L0) to 600° C. at a heating rate of 5° C./min from 25° C., keeping at 600° C. for 20 min, then cooling to 25° C. at a cooling rate of 5° C./min so that glass can shrink by a certain length, measuring the length of glass again and marking as Lt, and representing the thermal shrinkage rate Yt as:

$$Yt = \frac{L0 - Lt}{L0} * 100\%.$$

The content of hydroxyl group OH in glass is measured by the following method: testing a transmittance at the wave number in a range of 400-4000 cm-1 by a SPECTRUM TWO Fourier infrared spectrometer from PE company. The content β-OH of hydroxyl group in glass is calculated according to the following formula and has a unit of/mm:

β-$OH=(1/D)*\log 10(T1/T2)$, where
D: glass thickness (mm);
$T_1$: transmittance (%) with reference to the wavelength of 3846 cm$^{-1}$ (2600 nm);
$T_2$: minimum transmittance (%) near the hydroxyl group absorbable wavelength of 3600 cm$^{-1}$ (2800 nm).

Examples 1-8

The components were weighed as shown in Table 1 and evenly mixed, and a mixture was poured into a high zirconium brick crucible (ZrO2>85 wt %), then heated in a resistant furnace at 1630° C. for 24 h, and slowly stirred at a constant speed by a platinum-rhodium alloy (80 wt % Pt+20 wt % Rh) stirrer. Molten glass was poured into stainless steel dies to form specified blocky glass products, the glass products were thereafter annealed for 2 h in an annealing furnace, and were cooled to 25° C. by powering off the annealing furnace. The glass products are were cut, ground and polished, then washed cleanly with deionized water and dried to prepare finished products with a thickness of 0.5 mm. Various performances of each finished product is measured, and results were shown in Table 1.

Examples 9-15

Prepare according to the method of Example 1 and what is different is that the mixture composition (corresponding to the glass composition) and measurement results of performances of the obtained products are shown in Table 2.

Comparative Examples 1-4

Prepare according to the method of Example 1 and what is different is that the mixture composition (corresponding to the glass composition) and measurement results of performances of the obtained products are shown in Table 3.

TABLE 1

| Component (mol %) | Example 1 | Example 2 | Example 3 | Example 4 | Example 5 | Example 6 | Example 7 | Example 8 |
|---|---|---|---|---|---|---|---|---|
| $SiO_2$ | 70.9 | 71.1 | 71.6 | 70.2 | 70.6 | 70.4 | 70.7 | 71.4 |
| $Al_2O_3$ | 13.9 | 12.8 | 13.7 | 12.9 | 13.5 | 12.4 | 12.7 | 12.6 |
| $B_2O_3$ | 1 | 0 | 0.42 | 0.3 | 0.47 | 0.11 | 0 | 0.1 |
| MgO | 2.8 | 3.9 | 3.3 | 4.96 | 4.2 | 4.4 | 4.9 | 3.2 |
| CaO | 4.3 | 3.4 | 3.7 | 4.1 | 5.1 | 5.4 | 4.6 | 5.95 |
| SrO | 0.8 | 1 | 0.5 | 1 | 0.2 | 0.3 | 0.76 | 0.4 |
| BaO | 3.95 | 6.7 | 4.1 | 4.84 | 4.67 | 5.9 | 5.1 | 4.9 |
| ZnO | 1.27 | 0.5 | 1.48 | 0.65 | 0.4 | 0.37 | 0.3 | 0.44 |

TABLE 1-continued

| Component (mol %) | Example 1 | Example 2 | Example 3 | Example 4 | Example 5 | Example 6 | Example 7 | Example 8 |
|---|---|---|---|---|---|---|---|---|
| $Y_2O_3$ | 0 | 0 | 0 | 0 | 0 | 0 | 0 | 0 |
| $La_2O_3$ | 0 | 0 | 0 | 0 | 0 | 0 | 0 | 0 |
| $Nd_2O_3$ | 0 | 0 | 0 | 0 | 0 | 0 | 0 | 0 |
| $Lu_2O_3$ | 0.45 | 0.1 | 0.35 | 0.24 | 0.23 | 0.48 | 0.2 | 0.43 |
| $Se_2O_3$ | 0.29 | 0.25 | 0.3 | 0.21 | 0.03 | 0.02 | 0.19 | 0.27 |
| F | 0.34 | 0.25 | 0.55 | 0.6 | 0.6 | 0.22 | 0.55 | 0.31 |
| $Fe_2O_3$ | 0.005 | 0.003 | 0.002 | 0.004 | 0.001 | 0.001 | 0.008 | 0.007 |
| (CaO + BaO)/(MgO + CaO + SrO + BaO + ZnO) | 0.6 | 0.7 | 0.6 | 0.6 | 0.7 | 0.7 | 0.6 | 0.7 |
| (MgO + BaO)/(1 − $M_2O_3$) | 0.5 | 0.7 | 0.5 | 0.6 | 0.6 | 0.6 | 0.6 | 0.5 |
| $Se_2O_3/Fe_2O_3$ | 58.0 | 83.3 | 150.0 | 52.5 | 30.0 | 20.0 | 23.8 | 38.6 |
| Z | 2.5 | 3.2 | 2.6 | 2.5 | 2.6 | 2.8 | 2.6 | 2.7 |
| G | 3.7 | 3.7 | 3.6 | 3.2 | 3.1 | 3.8 | 3.2 | 3.8 |
| T | 4.3 | 4.1 | 4.5 | 4.2 | 4.0 | 4.2 | 4.1 | 4.4 |
| S (ppm) | 42.1 | 38.9 | 40.6 | 37.7 | 44.3 | 45.6 | 47.1 | 37.9 |
| Hydroxyl group OH (/mm) | 0.26 | 0.25 | 0.23 | 0.19 | 0.26 | 0.23 | 0.25 | 0.24 |
| Density (g/cm³) | 2.61 | 2.64 | 2.60 | 2.62 | 2.58 | 2.64 | 2.62 | 2.64 |
| Expansion (×$10^{-7}$/° C.) | 34.0 | 38.9 | 33.2 | 37.0 | 35.9 | 38.8 | 37.8 | 37.1 |
| Young's modulus (GPa) | 82.0 | 82.0 | 81.7 | 83.2 | 83.3 | 83.0 | 83.2 | 82.1 |
| Modular ratio (GPa/g/cm³) | 31.4 | 31.1 | 31.4 | 31.7 | 32.3 | 31.4 | 31.8 | 31.1 |
| Surface tension at 1200° C. (mN/m) | 361.3 | 363.9 | 362.8 | 360.6 | 366.0 | 358.3 | 361.9 | 360.1 |
| Volume resistivity at 1600° C. (Ω · cm) | 162.1 | 158.2 | 165.1 | 160.1 | 163.3 | 157.3 | 160.6 | 159.9 |
| $T_{200}$ (° C.) | 1679.1 | 1687.5 | 1687.3 | 1671.8 | 1683.5 | 1666.1 | 1678.0 | 1674.1 |
| $T_{35000}$ (° C.) | 1297.2 | 1303.1 | 1310.2 | 1282.3 | 1295.7 | 1288.9 | 1287.3 | 1284.7 |
| $T_L$ (° C.) | 1170 | 1160 | 1150 | 1170 | 1170 | 1160 | 1150 | 1160 |
| $T_{35000} - T_L$ (° C.) | 127 | 143 | 160 | 112 | 126 | 129 | 137 | 125 |
| Annealing point (° C.) | 817 | 817 | 820 | 812 | 822 | 808 | 816 | 815 |
| Strain point (° C.) | 761 | 764 | 769 | 758 | 772 | 759 | 765 | 766 |
| Transmittance at 308 nm (%) | 74.8 | 75.2 | 76.7 | 74.7 | 74.3 | 75.6 | 74.4 | 74.2 |
| Transmittance at 550 nm (%) | 92.2 | 92 | 92.9 | 92.3 | 92.1 | 92.2 | 92.3 | 92.4 |
| Thermal shrinkage rate ppm | 9.7 | 9.6 | 8.4 | 9.9 | 7.8 | 9.2 | 8.9 | 9.1 |

TABLE 2

| Component (mol %) | Example 9 | Example 10 | Example 11 | Example 12 | Example 13 | Example 14 | Example 15 |
|---|---|---|---|---|---|---|---|
| $SiO_2$ | 71.9 | 69.2 | 69.56 | 69.95 | 72.36 | 69.1 | 72.97 |
| $Al_2O_3$ | 11.95 | 13.4 | 11.1 | 11.6 | 14.69 | 14.9 | 11.3 |
| $B_2O_3$ | 0 | 0.46 | 2 | 0 | 0.1 | 1.31 | 0 |
| MgO | 5 | 4.7 | 2 | 7.95 | 2.2 | 2 | 2 |
| CaO | 2.9 | 5.9 | 6.6 | 4.5 | 2 | 8 | 2.4 |
| SrO | 0.1 | 0.3 | 0 | 0 | 3 | 0 | 0 |
| BaO | 6.95 | 4.8 | 7.9 | 3.2 | 3 | 3 | 10 |
| ZnO | 0.45 | 0.3 | 0.3 | 2 | 1.43 | 0.13 | 0.1 |
| $Y_2O_3$ | 0 | 0.2 | 0.02 | 0 | 0.3 | 0.07 | 0.08 |
| $La_2O_3$ | 0 | 0.2 | 0 | 0.21 | 0.2 | 0 | 0.18 |
| $Nd_2O_3$ | 0 | 0 | 0 | 0.2 | 0.1 | 0.3 | 0 |
| $Lu_2O_3$ | 0.23 | 0 | 0 | 0 | 0.1 | 0 | 0.1 |
| $Se_2O_3$ | 0.1 | 0.14 | 0.01 | 0.29 | 0.5 | 0.39 | 0.35 |
| F | 0.42 | 0.4 | 0.51 | 0.1 | 0.02 | 0.8 | 0.52 |
| $Fe_2O_3$ | 0.003 | 0.01 | 0.001 | 0.001 | 0.01 | 0.009 | 0.001 |
| (CaO + BaO)/(MgO + CaO + SrO + BaO + ZnO) | 0.6 | 0.7 | 0.9 | 0.4 | 0.4 | 0.8 | 0.9 |
| (MgO + BaO)/(1 − $M_2O_3$) | 0.7 | 0.6 | 0.6 | 0.6 | 0.4 | 0.3 | 0.8 |
| $Se_2O_3/Fe_2O_3$ | 33.3 | 14.0 | 10.0 | 290.0 | 50.0 | 43.3 | 350.0 |
| Z | 3.3 | 2.3 | 3.2 | 1.6 | 2.8 | 2.0 | 4.5 |
| G | 3.9 | 3.3 | 3.2 | 2.8 | 4.7 | 3.1 | 5.6 |
| T | 4.6 | 3.9 | 4.1 | 2.9 | 4.7 | 4.4 | 6.4 |
| S (ppm) | 38.4 | 33.8 | 39.2 | 33.5 | 38.8 | 39.1 | 43.4 |

TABLE 2-continued

| Component (mol %) | Example 9 | Example 10 | Example 11 | Example 12 | Example 13 | Example 14 | Example 15 |
|---|---|---|---|---|---|---|---|
| Hydroxyl group OH (/mm) | 0.22 | 0.28 | 0.28 | 0.29 | 0.28 | 0.27 | 0.29 |
| Density (g/cm$^3$) | 2.64 | 2.60 | 2.66 | 2.60 | 2.62 | 2.55 | 2.67 |
| Expansion (×10$^{-7}$/°C.) | 38.1 | 38.0 | 39.3 | 36.1 | 31.7 | 35.1 | 39.4 |
| Young's modulus (GPa) | 82.3 | 84.9 | 82.0 | 85.8 | 81.9 | 83.1 | 80.3 |
| Modular ratio (GPa/g/cm$^3$) | 31.1 | 32.6 | 30.8 | 33.1 | 31.3 | 32.6 | 30.0 |
| Surface tension at 1200° C. (mN/m) | 356.9 | 364.0 | 361.9 | 351.8 | 362.8 | 370.1 | 353.8 |
| Volume resistivity at 1600° C. (Ω·cm) | 160.6 | 179.4 | 174.7 | 175.8 | 171.0 | 172.2 | 174.1 |
| $T_{200}$ (° C.) | 1689.7 | 1648.9 | 1679.5 | 1647.8 | 1704.6 | 1635.5 | 1727.9 |
| $T_{35000}$ (° C.) | 1304.5 | 1266.0 | 1265.5 | 1257.6 | 1331.0 | 1278.5 | 1323.3 |
| $T_L$ (° C.) | 1170 | 1180 | 1210 | 1180 | 1260 | 1220 | 1250 |
| $T_{35000} - T_L$ (° C.) | 134 | 86 | 56 | 78 | 71 | 58 | 73 |
| Annealing point (° C.) | 812 | 814 | 797 | 800 | 838 | 830 | 814 |
| Strain point (° C.) | 759 | 763 | 758 | 757 | 786 | 777 | 760 |
| Transmittance at 308 nm(%) | 74.3 | 73.3 | 75.2 | 75.4 | 73.2 | 73.6 | 74.9 |
| Transmittance at 550 nm(%) | 92.1 | 91.7 | 92.9 | 93 | 91.6 | 91.4 | 92.7 |
| Thermal shrinkage rate ppm | 9.4 | 9.8 | 13.3 | 14.7 | 6.8 | 8.9 | 3.3 |

TABLE 3

| Component (mol %) | Comparative example 1 | Comparative example 2 | Comparative example 3 | Comparative example 4 |
|---|---|---|---|---|
| SiO$_2$ | 70.6 | 70.6 | 70.6 | 70.6 |
| Al$_2$O$_3$ | 13.5 | 13.5 | 13.5 | 13.5 |
| B$_2$O$_3$ | 0.47 | 0.47 | 0.47 | 0.47 |
| MgO | 4.2 | 4.2 | 4.2 | 4.2 |
| CaO | 5.1 | 5.1 | 5.1 | 5.1 |
| SrO | 4.67 | 0.4 | 0.2 | 0.2 |
| BaO | 0.2 | 4.67 | 4.67 | 4.67 |
| ZnO | 0.4 | 0.43 | 0.4 | 0.37 |
| Y$_2$O$_3$ | 0 | 0 | 0 | 0 |
| La$_2$O$_3$ | 0 | 0 | 0 | 0 |
| Nd$_2$O$_3$ | 0 | 0 | 0 | 0 |
| Lu$_2$O$_3$ | 0.23 | 0 | 0.26 | 0.26 |
| Se$_2$O$_3$ | 0.03 | 0.03 | 0 | 0.63 |
| F | 0.6 | 0.6 | 0.6 | 0 |
| Fe$_2$O$_3$ | 0.006 | 0.006 | 0.006 | 0.006 |
| (CaO + BaO)/(MgO + CaO+ SrO + BaO + ZnO) | 0.4 | 0.7 | 0.7 | 0.7 |
| (MgO + BaO)/(1 − M$_2$O$_3$) | 0.3 | 0.6 | 0.6 | 0.6 |
| Se$_2$O$_3$/Fe$_2$O$_3$ | 5.0 | 5.0 | 0.0 | 105.0 |
| Z | 1.5 | 2.6 | 2.6 | 2.6 |
| G | 2.1 | 2.6 | 3.1 | 3.7 |
| T | 3.0 | 3.6 | 4.1 | 3.7 |
| S (ppm) | 502.1 | 1412.7 | 43.7 | 45.2 |
| Hydroxyl group OH (/mm) | 0.24 | 0.22 | 0.25 | 0.41 |
| Density (g/cm$^3$) | 2.51 | 2.56 | 2.58 | 2.63 |
| Expansion (×10$^{-7}$/°C.) | 35.6 | 38.1 | 35.9 | 35.9 |
| Young's modulus (GPa) | 84.4 | 83.5 | 83.3 | 83.3 |
| Modular ratio (GPa/g/cm$^3$) | 33.6 | 32.7 | 32.3 | 31.7 |
| Surface tension at 1200° C. (mN/m) | 369.0 | 371.0 | 365.7 | 409.5 |
| Volume resistivity at 1600° C. (Ω·cm) | 121.6 | 224.8 | 163.2 | 160.5 |
| $T_{200}$ (° C.) | 1671.4 | 1693.7 | 1683.4 | 1654.4 |
| $T_{35000}$ (° C.) | 1291.6 | 1303.2 | 1295.1 | 1281.6 |
| $T_L$ (° C.) | 1270 | 1200 | 1190 | 1180 |
| $T_{35000} - T_L$ (° C.) | 22 | 103 | 105 | 102 |
| Annealing point (° C.) | 826 | 774 | 822 | 817 |
| Strain point (° C.) | 775 | 721 | 773 | 764 |
| Transmittance at 308 nm (%) | 74.1 | 74 | 58.3 | 54.9 |
| Transmittance at 550 nm (%) | 92.2 | 92.3 | 91.5 | 88.7 |
| Thermal shrinkage rate ppm | 7.6 | 17.4 | 8.2 | 8.4 |

It is clear, by comparing data of examples and comparative examples in Tables 1-2, that the method of the present invention has a remarkable effect on acquiring high ultraviolet transmittance, high strain point (high thermal resistance) and relatively low volume resistivity. Through the composition, limited ratio, limited scope of Z/G/T values, not excessive control over the content of iron oxide in raw materials, a proper content of Se$_2$O$_3$ and fluoride and the preparation method provided by the present invention, the alkali-free non-alkali aluminosilicatealuminum silicate glass obtained according to the composition has relatively high thermal stability, relatively low high-temperature volume resistivity, relatively high ultraviolet and visible light spectrum transmittance, relatively high Young's modulus, relatively low melting temperature and liquidus temperature and relatively low surface tension, and is suitable for large-scale industrial manufacturing, suitable for preparing molten glass with electric heating for producing a partial or whole energy source, and suitable for application in preparation of display devices and/or solar cells. The non-alkali aluminum silicate glass can be particularly suitable for the application fields of preparation of glass substrate materials and/or glass film materials for screen surface protection of flat panel display products, glass substrate materials and/or glass materials for surface packaging and/or glass film materials for screen surface protection of flexible display products, glass substrate materials of flexible solar cells, safety glass, bulletproof glass, intelligent automobile glass, intelligent traffic display screens, intelligent shop windows, intelligent cards and tickets and glass materials for other needs with high thermal stability, high ultraviolet transmittance and high mechanical stability.

The preferred embodiments of the present invention are described in detail above, but the present invention is not limited hereto. Various simple modifications can be made on the technical solution of the present invention within the scope of technical concept of the present invention, including combinations of various technical features in any other proper modes, and such simple modifications and combinations should also be deemed as the content disclosed by the present invention and all belong to the protection scope of the present invention.

The invention claimed is:

1. Non-alkali aluminum silicate glass, wherein a glass melt of the non-alkali aluminum silicate glass at 1600° C. has:
   a resistivity of 200 Ω·cm or less;
   a temperature $T_{35000}$ corresponding to 35000 P viscosity is 1250° C. or more; and
   a annealing point corresponding to $10^{13}$ P viscosity is 790° C. or more;
   wherein based on a total molar weight of the non-alkali aluminum silicate glass, the non-alkali aluminum silicate glass comprises, by oxide:
   69-73 mol % of $SiO_2$,
   11-15 mol % of $Al_2O_3$,
   0-2 mol % of $B_2O_3$,
   2-8 mol % of MgO,
   2-8 mol % of CaO,
   0-3 mol % of SrO,
   3-10 mol % of BaO,
   0.1-2 mol % of ZnO,
   0.02-0.7 mol % of $RE_2O_3$,
   0.01-0.5 mol % of $Se_2O_3$, and
   less than 0.05 mol % of $R_2O$,
   where RE represents rare earth elements, and R represents alkali metals.

2. The non-alkali aluminum silicate glass according to claim 1, wherein the glass melt of the non-alkali aluminum silicate glass at 1600° C. has a viscosity of 350-550 P.

3. The non-alkali aluminum silicate glass according to claim 1, wherein based on the total molar weight of the non-alkali aluminum silicate glass, the non-alkali aluminum silicate glass comprises, by oxide:
   70-72 mol % of $SiO_2$,
   12-14 mol % of $Al_2O_3$,
   0-1 mol % of $B_2O_3$,
   3-5 mol % of MgO,
   3-6 mol % of CaO,
   0.1-1 mol % of SrO,
   4-7 mol % of BaO,
   0.3-1.5 mol % of ZnO,
   0.1-0.5 mol % of $RE_2O_3$,
   0.02-0.3 mol % of $Se_2O_3$, and
   $R_2O$ less than 0.05 mol %,
   wherein RE represents rare earth elements, and R represents alkali metals.

4. The non-alkali aluminum silicate glass according to claim 1, wherein based on the total molar weight of the non-alkali aluminum silicate glass, represented in the form of $Fe_2O_3$, the non-alkali aluminum silicate glass comprises 0.001-0.01 mol % of $Fe_2O_3$.

5. The non-alkali aluminum silicate glass according to claim 1, wherein based on the total molar weight of the non-alkali aluminum silicate glass, represented in the form of elemental F, the non-alkali aluminum silicate glass comprises 0.01-0.8 mol % of F.

6. The non-alkali aluminum silicate glass according to claim 5, wherein by molar percentage, $Se_2O_3/Fe_2O_3>10$.

7. The non-alkali aluminum silicate glass according to claim 1, wherein by molar percentage, contents of components in the non-alkali aluminum silicate glass satisfies the equation: Z=1.5-4.5, wherein Z is calculated according to the following formula:

$$Z=-10.31+(16.04\times SiO_2+6\times Al_2O_3+3.29\times B_2O_3-5.47\times MgO-5.43\times CaO+3.77\times SrO+26.65\times BaO-7.82\times ZnO),$$

wherein $SiO_2$, $Al_2O_3$, MgO, CaO, SrO, BaO and ZnO represent molar percentages of the components in the non-alkali aluminum silicate glass, respectively.

8. The non-alkali aluminum silicate glass according to claim 1, wherein by molar percentage, the contents of the components in the non-alkali aluminum silicate glass satisfy the equation: G=2.5-6, wherein G is calculated according to the following formula:

$$G=-10.31+(16.04\times SiO_2+6\times Al_2O_3+3.29\times B_2O_3-5.47\times MgO-5.43\times CaO+3.77\times SrO+26.65\times BaO-7.82\times ZnO+214.8\times RE_2O_3+86.3\times Se_2O_3),$$

wherein $SiO_2$, $Al_2O_3$, $B_2O_3$, MgO, CaO, SrO, BaO, ZnO, $RE_2O_3$ and $Se_2O_3$ represent molar percentages of the components in the non-alkali aluminum silicate glass, respectively.

9. The non-alkali aluminum silicate glass according to claim 1, wherein by molar percentage, the contents of the components in the non-alkali aluminum silicate glass satisfy the equation: T=3-6.5, wherein T is calculated according to the following formula:

$$T=-10.31+(16.04\times SiO_2+6\times Al_2O_3+3.29\times B_2O_3-5.47\times MgO-5.43\times CaO+3.77\times SrO+26.65\times BaO-7.82\times ZnO+214.8\times RE_2O_3+86.3\times Se_2O_3+162.5\times F),$$

wherein $SiO_2$, $Al_2O_3$, $B_2O_3$, MgO, CaO, SrO, BaO, ZnO, $RE_2O_3$, $Se_2O_3$ and F represent molar percentages of the components in the non-alkali aluminum silicate glass, respectively.

10. The non-alkali aluminum silicate glass according to claim 1, wherein by molar percentage, (CaO+BaO)/(MgO+CaO+SrO+BaO+ZnO)≥0.6.

11. The non-alkali aluminum silicate glass according to claim 1, wherein RE represents yttrium and lanthanide, and R represents Li, Na and K.

12. The non-alkali aluminum silicate glass according to claim 1, wherein:
   a density of the non-alkali aluminum silicate glass is less than 2.7 g/cm$^3$;
   a coefficient of thermal expansion at 50-350° C. of the non-alkali aluminum silicate glass is less than 40×10−7/° C.;
   a Young's modulus of the non-alkali aluminum silicate glass is greater than 80 GPa;
   a modular ratio of the non-alkali aluminum silicate glass is greater than 30 GPa/(g×cm$^{-3}$);
   a temperature $T_{200}$ corresponding to 200 P viscosity of the non-alkali aluminum silicate glass is 1730° C. or less;
   a liquidus temperature $T_L$ of the non-alkali aluminum silicate glass is 1260° C. or less;

a difference between the temperature corresponding to 35000 P viscosity and the liquidus temperature $T_L$ of the non-alkali aluminum silicate glass is 50° C. or more;

a transmittance at a wavelength of 308 nm of the non-alkali aluminum silicate glass is 73% or more;

at a wavelength of 550 nm, a transmittance of the non-alkali aluminum silicate glass is 91% or more; and a thermal shrinkage rate of the non-alkali aluminum silicate glass under a condition of 600° C./20 min is less than 15 ppm.

13. A preparation method of non-alkali aluminum silicate glass, comprising: sequentially performing a melting treatment, a forming treatment, an annealing treatment, and a machining treatment on a mixture required by the non-alkali aluminum silicate glass of claim 1.

14. The preparation method of the non-alkali aluminum silicate glass according to claim 13, further comprising: adding fluoride to the mixture, wherein based on a total weight of the mixture, an addition amount of the fluoride is 0.02-0.7 wt %.

15. The non-alkali aluminum silicate glass of claim 1, wherein the non-alkali aluminum silicate glass is incorporated into a display device or a solar cell.

16. The non-alkali aluminum silicate glass according to claim 1, wherein the content of sulfur element, represented in the form of elemental sulfur S, in the non-alkali aluminum silicate glass is 50 ppm or less.

17. The non-alkali aluminum silicate glass according to claim 1, wherein the content of hydroxyl group in the non-alkali aluminum silicate glass is 0.3/mm or less.

18. The non-alkali aluminum silicate glass according to claim 10, wherein (MgO+BaO)/(1−MO)≥0.5, wherein based on the total molar weight of the non-alkali aluminum silicate glass, MO represents the sum of molar percentages of the components except $SiO_2$, $Al_2O_3$ and $B_2O_3$ in the non-alkali aluminum silicate glass.

19. The non-alkali aluminum silicate glass according to claim 11, wherein RE represents one or more of Y, La, Nd and Lu.

* * * * *